United States Patent
Kim et al.

(10) Patent No.: US 11,584,053 B2
(45) Date of Patent: Feb. 21, 2023

(54) INNER PART AND RESIN MOLDED ARTICLE

(71) Applicant: Sumitomo Wiring Systems, Ltd., Yokkaichi (JP)

(72) Inventors: Kyungwoo Kim, Yokkaichi (JP); Toshinari Kobayashi, Yokkaichi (JP); Moriyuki Shimizu, Yokkaichi (JP); Koichi Kato, Yokkaichi (JP); Hironobu Yamamoto, Yokkaichi (JP); Yukitoshi Terasaka, Yokkaichi (JP)

(73) Assignee: Sumitomo Wiring Systems, Ltd., Yokkaichi (JP)

( * ) Notice: Subject to any disclaimer, the term of this patent is extended or adjusted under 35 U.S.C. 154(b) by 295 days.

(21) Appl. No.: 16/767,880

(22) PCT Filed: Nov. 7, 2018

(86) PCT No.: PCT/JP2018/041292
§ 371 (c)(1),
(2) Date: May 28, 2020

(87) PCT Pub. No.: WO2019/107097
PCT Pub. Date: Jun. 6, 2019

(65) Prior Publication Data
US 2020/0368948 A1  Nov. 26, 2020

(30) Foreign Application Priority Data
Nov. 28, 2017  (JP) .............................. JP2017-227385

(51) Int. Cl.
*B29C 45/14* (2006.01)
*B29C 45/00* (2006.01)
(Continued)

(52) U.S. Cl.
CPC .... *B29C 45/14311* (2013.01); *B29C 45/0005* (2013.01); *B29C 45/14* (2013.01);
(Continued)

(58) Field of Classification Search
CPC ................ B29C 45/14; B29C 45/1418; B29C 45/14311
See application file for complete search history.

(56) References Cited

U.S. PATENT DOCUMENTS 3,308,225 A * 3/1967 Wells .................. B29C 37/0082
229/5.5
3,544,143 A * 12/1970 Ohlsson ............ B29C 66/81431
411/548

(Continued)

FOREIGN PATENT DOCUMENTS

| JP | 2004-216931 | 8/2004 |
|----|-------------|--------|
| JP | 2005-007715 A | 1/2005 |

OTHER PUBLICATIONS

International Search Report, Application No. PCT/JP2018/041292, dated Jan. 8, 2019. ISA/Japan Patent Office.

*Primary Examiner* — Edmund H Lee
(74) *Attorney, Agent, or Firm* — Honigman LLP

(57) ABSTRACT

Provided are an inner part and a resin molded article according to which it is possible to mitigate the concentration of stress at a distal end of a melt rib. An inner part, around which an outer portion is to be arranged through integral molding, includes a main body portion made of resin, and a melt rib provided protruding outward from the main body portion. The melt rib is formed such that a height of the melt rib is greater than a thickness of the melt rib, the thickness decreases from the main body portion to a distal end of the melt rib, and the melt rib includes a melting portion configured to partially melt during molding of the outer portion.

7 Claims, 4 Drawing Sheets

(51) Int. Cl.
    *B29K 105/12*    (2006.01)
    *B29K 105/20*    (2006.01)

(52) U.S. Cl.
    CPC ............... *B29C 45/1418* (2013.01); *B29C 2045/14319* (2013.01); *B29K 2105/12* (2013.01); *B29K 2105/20* (2013.01)

(56) References Cited

U.S. PATENT DOCUMENTS

| | | | | |
|---|---|---|---|---|
| 4,253,226 | A | * | 3/1981 | Takeda ............... A44B 17/0035 264/249 |
| 4,822,671 | A | * | 4/1989 | Carper ............... B29C 66/8322 428/140 |
| 5,153,052 | A | | 10/1992 | Tanaka et al. |
| 5,253,778 | A | * | 10/1993 | Sirosh ............... F17C 1/16 220/901 |
| 5,538,680 | A | * | 7/1996 | Enders ............... B29C 66/5344 264/516 |
| 5,768,669 | A | * | 6/1998 | Yokoyama ......... G03G 15/0921 399/282 |
| 5,937,486 | A | * | 8/1999 | Bockenheimer ...... B29C 65/602 411/908 |
| 6,235,362 | B1 | | 5/2001 | Just et al. |
| 6,334,361 | B1 | | 1/2002 | De Volder et al. |
| 9,750,496 | B2 | * | 9/2017 | Bonutti ............. A61B 17/0487 |
| 2002/0058122 | A1 | | 5/2002 | Arai et al. |
| 2006/0147672 | A1 | * | 7/2006 | Ruiz ............... B29C 65/607 264/296 |
| 2007/0035373 | A1 | * | 2/2007 | Henry ............... F02M 61/168 336/198 |
| 2018/0257279 | A1 | * | 9/2018 | Arai ............... B29C 45/1657 |

\* cited by examiner

INNER PART AND RESIN MOLDED ARTICLE

CROSS-REFERENCE TO RELATED APPLICATIONS

This application is the U.S. national stage of PCT/JP2018/041292 filed on Nov. 7, 2018, which claims priority of Japanese Patent Application No. JP 2017-227385 filed on Nov. 28, 2017, the contents of which are incorporated herein.

TECHNICAL FIELD

The present disclosure relates to an inner part and a resin molded article.

BACKGROUND

Conventionally, a technique has been known in which an inner part that has been primarily molded is set in a mold, and thereafter the mold is filled with a molten resin material, whereby an outer portion is formed and a resin molded article is manufactured. For example, JP 2005-7715A below discloses a technique in which a plate (inner part) holding a bus bar is set in a mold, and an outer cover (outer portion) is formed by filling the mold with a molten resin material. The outer surface of the plate is provided with melt ribs that are formed into triangular cross-sectional shapes with pointed distal ends, and when the mold is filled with the molten resin material, the distal end sides of the melt ribs are melted in the resin material and the melted portions are solidified in a state of having melted in with the resin material. Accordingly, a seal portion obtained by closely adhering the plate and the outer cover is formed on the distal ends of the melt ribs, and the seal portion can prevent liquid from entering.

However, with the above-described configuration, in an environment in which rapid heating and cooling are repeated, such as that during a thermal shock test, a temperature difference tends to occur in the resin body of the inner part and the resin body of the outer portion, and stress tends to be focused at the closely-adhered portions of the distal ends of the melt ribs.

That is, during heating, the temperature rises first in the outer portion, and during cooling, the temperature drops first in the outer portion, and therefore a temperature difference occurs in the resin body of the inner part and the resin body of the outer portion, distortions that occur in the resin body of outer portion and the resin body of the inner part do not match, and the stress is focused in the closely-adhered portions of the distal ends of the melt ribs. If this kind of stress is repeatedly applied to the distal ends of the melt ribs, there is concern that the closely-adhered portions of the distal ends of the melt ribs will eventually be broken and a gap through which liquid enters will be formed, and therefore a countermeasure has been desired.

The present disclosure was completed based on the above-described circumstances, and aims to provide an inner part and a resin molded article that can mitigate concentration of stress at a closely-adhered portion of a distal end of a melt rib.

SUMMARY

An inner part of the present disclosure, around which an outer portion is to be arranged through integral molding, includes: a main body portion made of resin; and a melt rib provided protruding outward from the main body portion. The melt rib is formed such that a height of the melt rib is greater than a thickness of the melt rib, the thickness decreases from the main body portion to a distal end of the melt rib, and the melt rib includes a melting portion configured to partially melt during molding of the outer portion.

A resin molded article of the present disclosure includes: the above-described inner part; and an outer portion that is molded around the inner part. The melting portion is closely adhered to the resin body of the outer portion.

Advantageous Effects of Disclosure

According to the present disclosure, even if distortions that occur in the resin body of the outer portion and the main body portion of the inner part do not match, the melt ribs bend, and therefore it is possible to mitigate the concentration of stress at the closely-adhered portion of the distal end of the melt rib.

DETAILED DESCRIPTION OF PREFERRED EMBODIMENTS

A preferred embodiment of the present disclosure will be illustrated hereinafter.

In the inner part of the present disclosure, the melting portion may also include a vertical surface and an inclined surface that is inclined with respect to the vertical surface. With this configuration, it is possible to sharpen the pointed shape of the distal end of the melt rib, and therefore it is possible to make the melt rib more likely to melt during molding of the outer portion.

In the resin molded article of the present disclosure, the main body portion may also be formed using a resin material that does not include reinforcing fibers, whereas the outer portion may also be formed using a resin material that includes reinforcing fibers. According to this configuration, it is possible to increase the strength of the resin body of the outer portion and obtain a resin body with excellent scratch resistance, and it is possible to increase the fracture toughness of the main body portion of the inner part and make the melt rib easier to bend.

Embodiment

Hereinafter, a specific embodiment of the present disclosure will be described in detail with reference to FIGS. 1 to 5.

A resin molded article M of the present embodiment is a vehicle sensor that is to be attached to a vehicle, and in particular, is a wheel speed sensor that is used to measure a wheel speed. The resin molded article M is fixed to a vehicle, opposing a rotor that rotates integrally with a wheel of the vehicle. The resin molded article M includes a wire harness 30 that is connected to a control apparatus and the like mounted in a vehicle, and the control apparatus of the vehicle calculates the wheel speed of the vehicle according to an output signal from the resin molded article M, and can be used in control of an ABS (anti-lock brake system) and the like.

Figure 1:
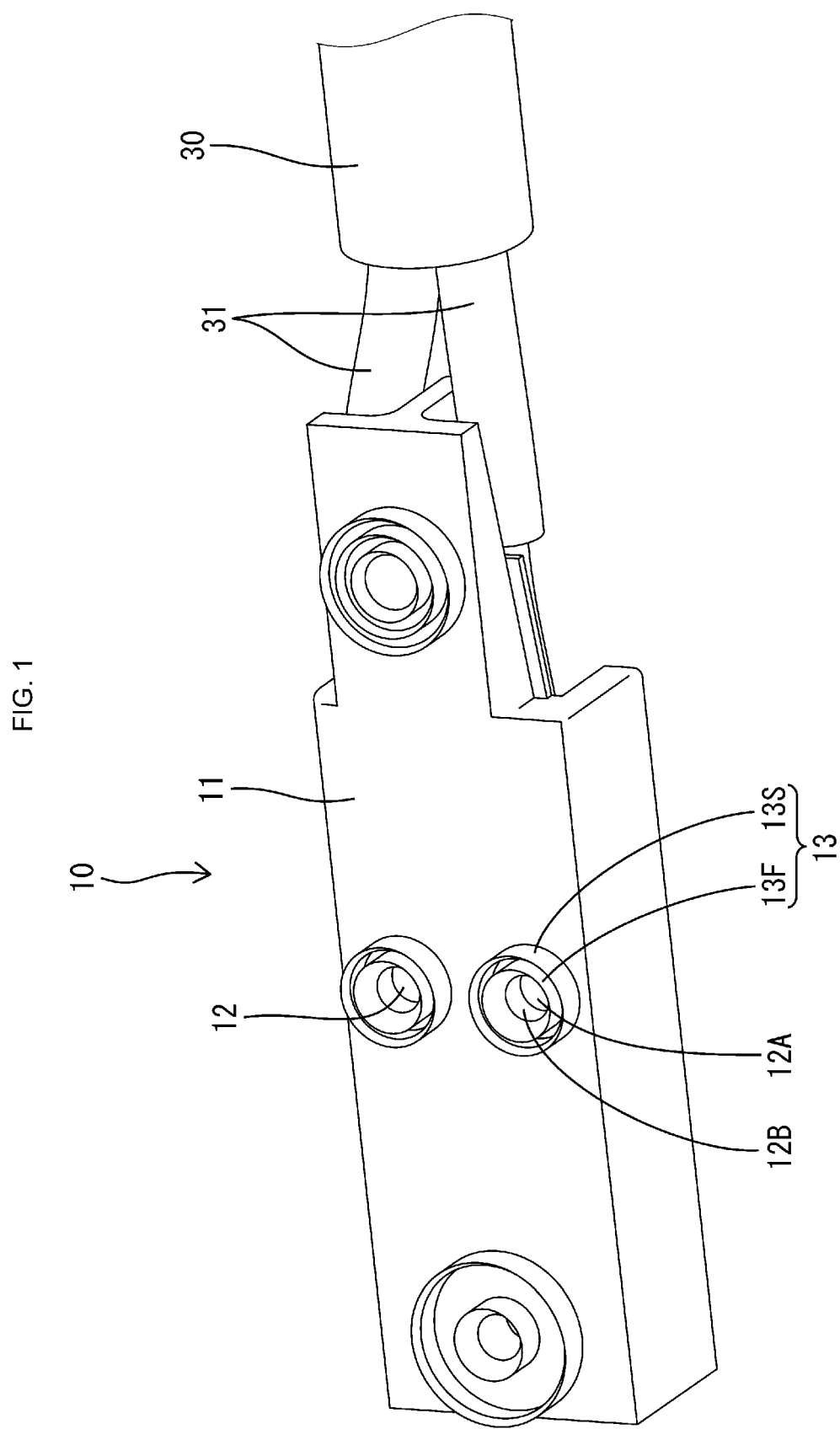
FIG. 1 is a perspective view showing an inner part of an embodiment.
Figure 2:
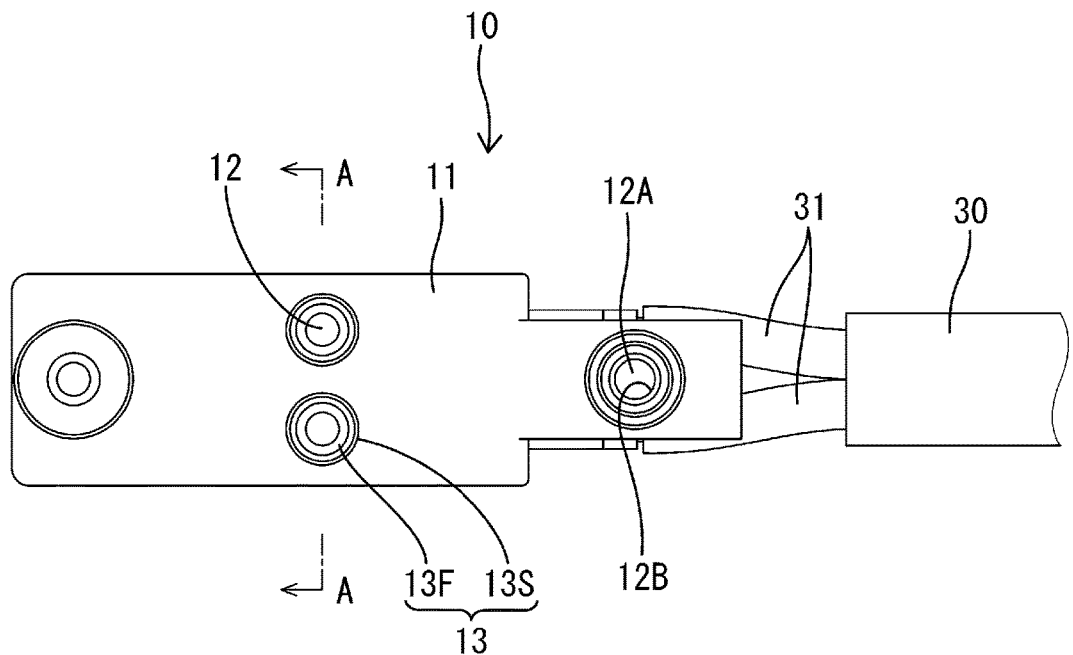
FIG. 2 is a plan view showing the inner part.

As shown in FIG. 1, the wire harness 30 forms one wire by collectively covering two electrical wires 31 with a resin covering or the like. In each electrical wire 31, a conductor is covered by an insulating covering, the insulating covering is removed at a terminal end portion, and the exposed conductor is electrically connected to a connection terminal of a sensor (not shown) using solder or the like.

The resin molded article M includes an inner part 10 that is connected to the wire harness 30, and an outer portion 20 that seals the inner part 10 with resin. The outer portion 20 is formed outside of the inner part 10 by filling a mold in which the inner part 10 has been set, with a molten resin material.

The inner part 10 includes a sensor including a detection element (not shown) that converts a target physical amount into an electrical amount or the like, and a holder (main body portion of the inner part 10) 11 that holds the sensor. The inner part 10 is an insert molded article obtained by insert-molding (primary molding) the holder 11 using a sensor as an insert article. The resin molded article M is an insert molded article that is obtained by insert-molding (secondary molding) the outer portion 20 using the inner part 10 to which the wire harness 30 is connected, as an insert article.

The holder 11 is formed using a material with a higher fracture toughness than the outer portion 20 and a lower melting point than the outer portion 20. The holder 11 is made of, for example, a synthetic resin such as a polyamide (PA) that does not include reinforcing fibers such as glass fibers.

The holder 11 has a shape that is elongated in the front-rear direction overall, and fixing portions 12 to which mold positioning pins (not shown) are to be fixed are formed at multiple locations on both the outer and underside surfaces of the holder 11.

As shown in FIG. 1, the fixing portions 12 are provided at multiple locations (four locations) on the outer surface of the holder 11 and one location on the underside surface of the holder 11. One of the fixing portions 12 provided on the outer surface of the holder 11 is provided at each of the front and rear end portions of the holder 11, and a pair of the fixing portions 12 are provided side by side in a width direction (left-right direction) in an intermediate portion in the front-rear direction, and the fixing portion 12 provided on the underside surface is provided in the central portion in the front-rear direction and the left-right direction of the holder 11.

Each fixing portion 12 is a recessed portion that includes a bottom surface 12A that a distal end surface of a positioning pin abuts on or is arranged near, and a peripheral surface 12B that an outer peripheral surface of a positioning pin abuts on or is arranged near. The fixing portions 12 are circular in a plan view.

Melt ribs 13 whose distal end portions melt during molding of the outer portion 20 are provided protruding on the outer surface of the holder 11. The melt ribs 13 will be described in detail later.

Figure 4:
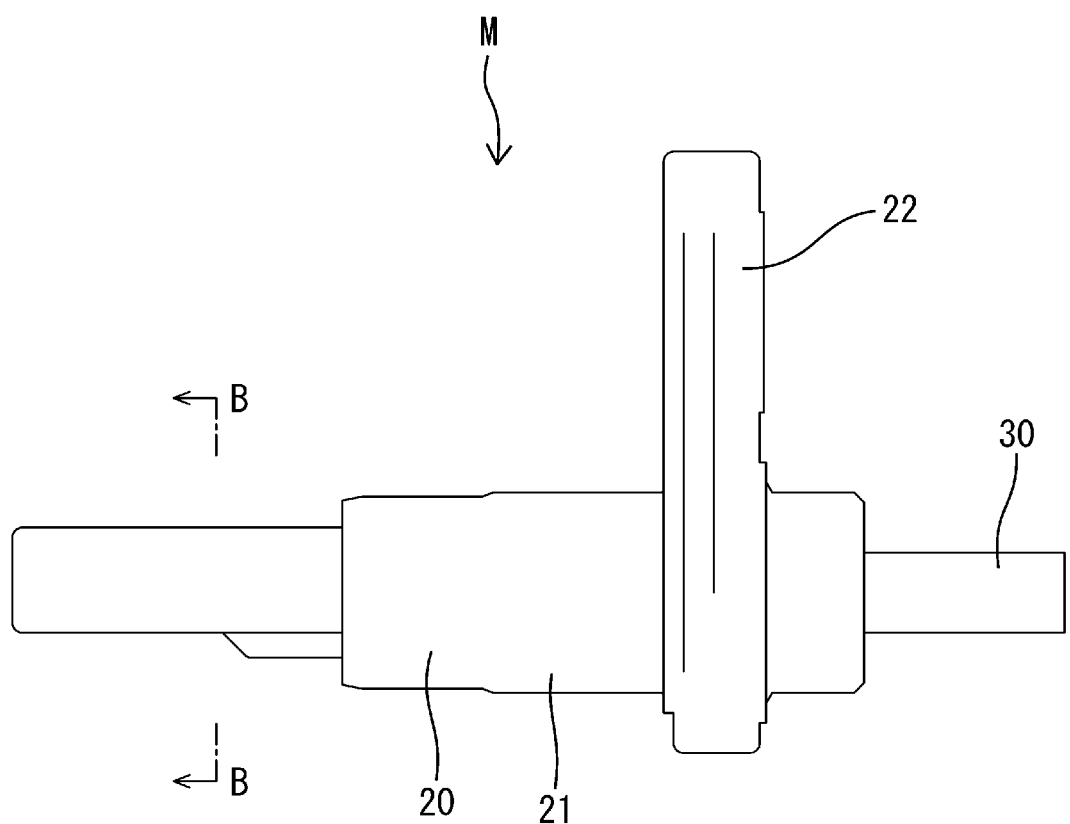
FIG. 4 is a side view showing a resin molded article.

A resin body 21 of the outer portion 20 is made of a synthetic resin such as polyamide (PA) including reinforcing fibers such as glass fibers or carbon fibers, and has excellent scratch resistance. As shown in FIG. 4, the resin body 21 of the outer portion 20 has a rod shape that is elongated overall in the extension direction of the wire harness 30, and covers the entirety from the terminal portion of the wire harness 30 to the front end of the inner part 10. The resin body 21 of the outer portion 20 is fixed to a bracket 22 that is fixed to the vehicle.

Figure 3:
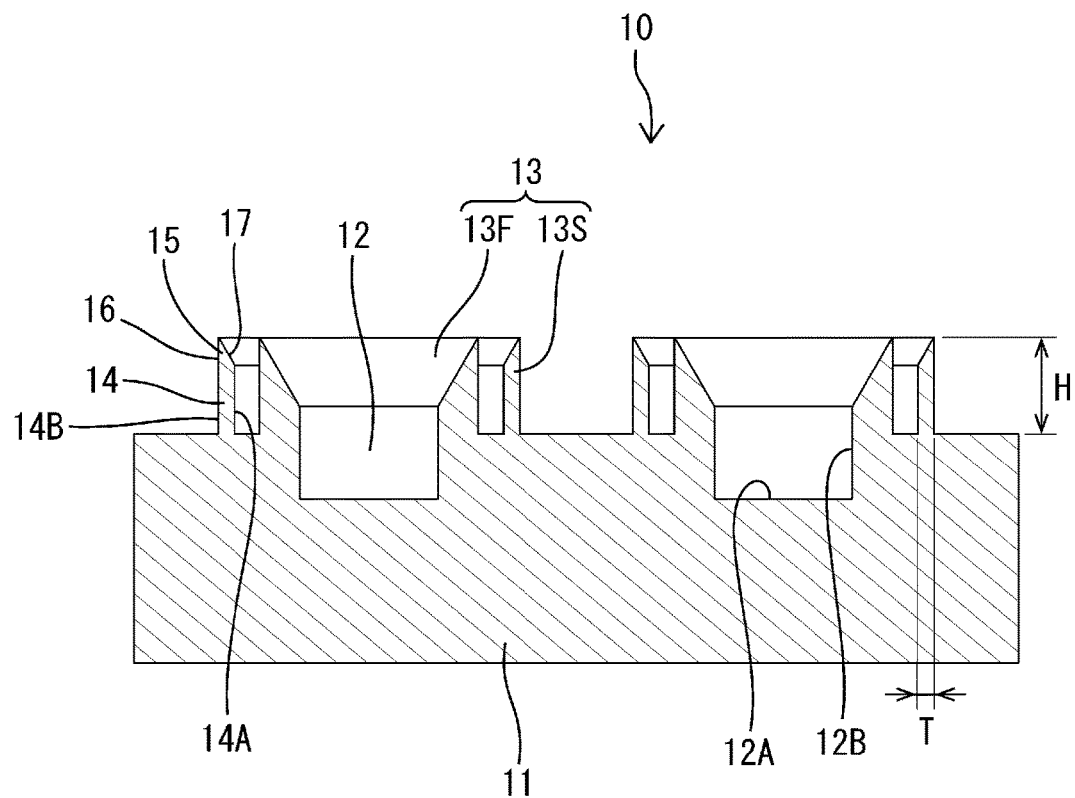
FIG. 3 is a cross-sectional view showing shapes of melt ribs, and is a cross-sectional view corresponding to a cross-section taken at position A-A in FIG. 2.

The melt ribs 13 are provided at multiple locations on the outer surface of the holder 11. The melt ribs 13 are provided around the fixing portions 12 and have approximately circular ring shapes with closed circumferences that individually surround the fixing portions 12. Multiple (in the present embodiment, two or three) melt ribs 13 are provided at each fixing portion 12. In each fixing portion 12, multiple melt ribs 13 are provided at a predetermined interval in the radial direction, centered about the fixing portion 12. In a plan view, the multiple melt ribs 13 that surround one fixing portion 12 have circular ring shapes with matching centers and radial dimensions that are different. As shown in FIG. 3, the multiple melt ribs 13 that surround each fixing portion 12 have equal heights H from the outer surface of the holder 11 to the distal ends.

Each melt rib 13 is formed such that its height H is greater than its thickness (dimension in a direction along the outer surface of the holder 11; dimension in the radial direction) T, and the thickness T decreases from the holder 11 to the distal end. The melt rib 13 includes a rising portion 14 that rises with a certain thickness T, and a melting portion 15 that partially melts during molding of the outer portion 20. The melting portion 15 has a thickness T that gradually decreases from the distal end of the rising portion 14 to the distal end of the melt rib 13.

The rising portion 14 has a thin wall shape, and one surface (inner peripheral surface) 14A in the radial direction and the other surface (outer peripheral surface) 14B are approximately parallel. Both the one surface 14A and the other surface 14B are approximately perpendicular to the outer surface of the holder 11.

A melt rib 13 that is the closest to a fixing portion 12 among multiple melt ribs surrounding the fixing portion 12 (hereinafter referred to as "first melt rib 13F") has a greater thickness T than each melt rib 13 arranged outside of the first melt rib 13F (hereinafter referred to as "second melt ribs 13S"). The inner peripheral surface of the first melt rib 13F constitutes a portion of the peripheral surface 12B of the fixing portion 12.

The melting portion 15 has a triangular cross-sectional shape with a pointed distal end. In other words, the melting portion 15 is formed into a tapered shape that is thinner toward its distal end.

The melting portion 15 includes a vertical surface 16 and an inclined surface 17 that is inclined with respect to the vertical surface 16. The vertical surface 16 is continuous along the other surface 14B of the rising portion 14 and is approximately perpendicular with respect to the outer surface of the holder 11. The inclined surface 17 intersects the vertical surface 16 at the distal end of the melt rib 13, and extends downward obliquely from the distal end of the melt rib 13 to the one surface 14A of the rising portion 14. An interior angle between the vertical surface 16 and the inclined surface 17 is an angle that is smaller than 45 degrees.

The height of the melting portion 15 of the first melt rib 13F is greater than the height of the rising portion 14, and the height of the melting portion 15 of the second rib 13S is smaller than the height of the rising portion 14. The inclined surface 17 of the first melt rib 13F and the inclined surface 17 of the second melt rib 13S are approximately parallel. The inclined surface 17 of the first melt rib 13F has a function of guiding the positioning pin into the fixing portion 12.

Next, an example of a method for manufacturing the resin molded article M in the present embodiment will be described. The method for manufacturing the resin molded article M includes a step of manufacturing the inner part 10 and a step of resin-sealing the inner part 10 using the outer portion 20.

First, the inner part 10 is manufactured. After a sensor is stored positioned in a mold for primary molding (not shown), the holder 11 is molded by injecting a resin material into the mold and curing the injected resin material. Also, the electrical wires 31 of the wire harness 30 are connected to the connection terminals of the sensor. Accordingly, an inner part 10 in which a sensor connected to a terminal of the wire harness 30 is embedded and integrated with the holder 11 is manufactured.

Next, the inner part 10 is sealed with resin. In the resin-sealing step, when the terminal portion of the wire harness 30 is passed through an insertion hole of the bracket 22, the inner part 10 is stored positioned (with a positioning pin locked to the fixing portion 12) in a mold for secondary molding (not shown), the resin material of the outer portion 20 is injected into the mold, and the injected resin material is cured.

Figure 5:
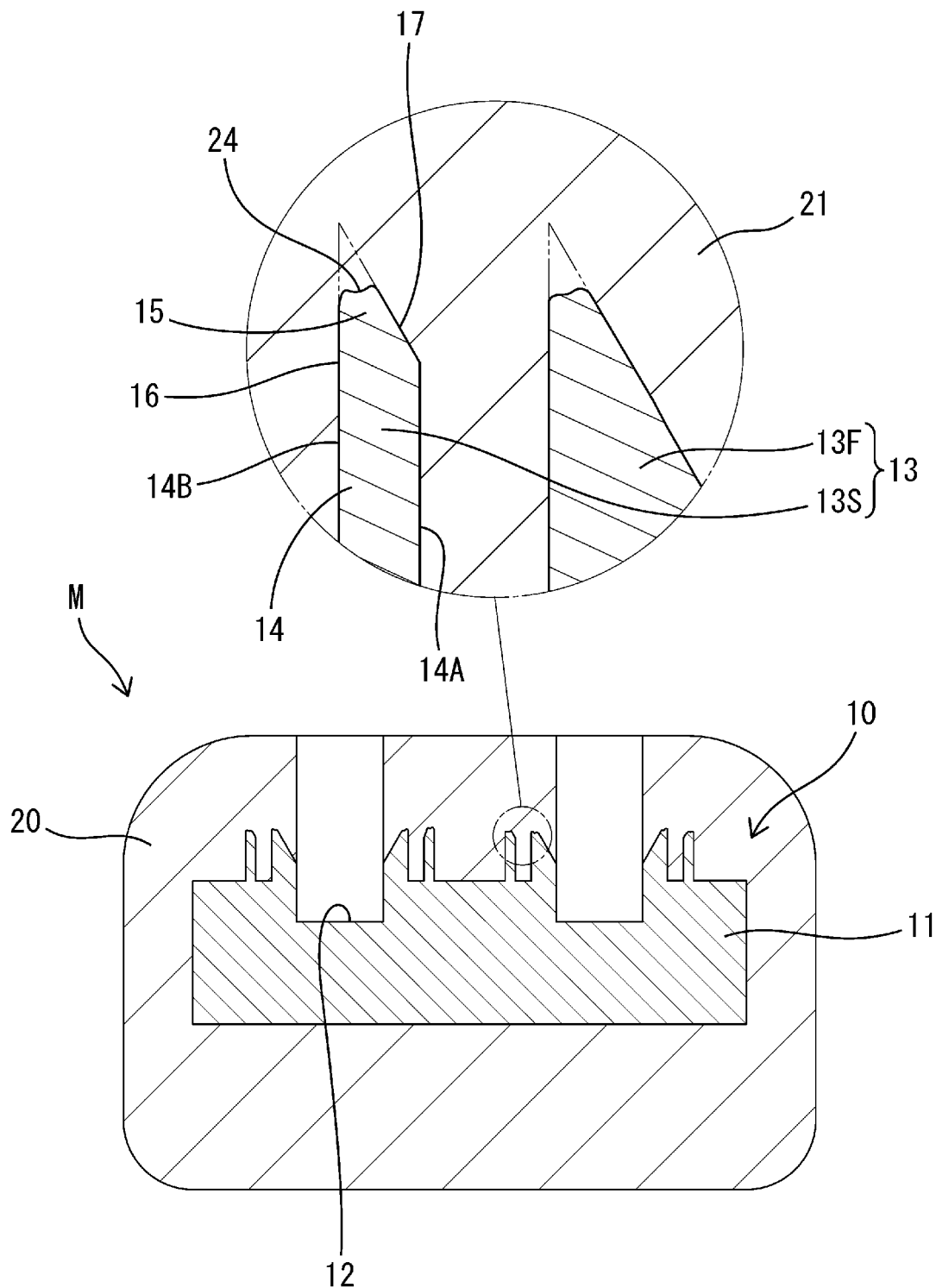
FIG. 5 is a cross-sectional view showing a state in which the melt ribs have melted, and is a cross-sectional view corresponding to a cross-section taken at position B-B in FIG. 4.

When the mold is filled with the molten resin material, as shown in FIG. 5, the distal ends of the melt ribs 13 melt due to the high-temperature resin material, and the melted portions of the melt ribs 13 melt together with the resin body 21 of the outer portion 20 and solidify. Accordingly, the distal ends of the melt ribs 13 closely adhere to the resin body 21 of the outer portion 20, and a route through which liquid enters is completely blocked at a close-adhesion surface 24 between the holder 11 and the resin body 21 of the outer portion 20. Thus, a seal portion that surrounds the entire periphery of the fixing portion 12 is formed around each fixing portion 12. Note that the molded outer portion 20 closely adheres in one piece to the peripheral surface of the insertion hole of the bracket 22, and the bracket 22 and the outer portion 20 are integrated.

Thus, the manufacture of the resin molded article M according to the present embodiment is complete.

If the resin molded article M of the present embodiment is placed in an environment in which rapid heating and cooling are repeated, such as an environment during a thermal shock test, for example, due to rapid heating, the outer portion 20 will heat first while the inner part 10 remains at a low temperature, and thus the resin body 21 of the outer portion 20 will expand, and the distortion of the resin body 21 of the outer portion 20 and the distortion of the holder 11 of the inner part 10 will be different from each other in some cases. Upon doing so, a force in a horizontal direction (direction parallel to the outer surface of the holder 11) acts on the melt ribs 13 due to the expansion of the resin body 21 of the outer portion 20. Here, in conventional melt ribs, the force in the horizontal direction tends to be concentrated at the distal ends of the melt ribs that are closely adhered to the resin body of the outer portion. However, in the resin molded article M of the present embodiment, due to the rising portions 14 of the melt ribs 13 bending, the distal ends of the melt ribs 13 can be displaced following the expansion of the outer portion 20, and therefore it is possible to prevent stress from being concentrated at the distal ends.

Next, actions and effects of the embodiment configured as described above will be described.

The inner part 10 of the present embodiment, around which the outer portion 20 is to be arranged through integral molding, includes a holder (main body portion) 11 made of resin, and a metal rib 13 that is provided protruding outward from the holder 11, the metal rib 13 is formed such that the height H is greater than the thickness T and the thickness T decreases from the holder 11 to the distal end, and the metal rib 13 includes the melting portion 15 that partially melts during molding of the outer portion 20. According to this configuration, even if distortions that occur in the resin body 21 of the outer portion 20 and the holder 11 of the inner part 10 do not match, concentration of stress on the closely-adhered portion on the distal end of the melt rib 13 can be mitigated due to the melt rib 13 bending.

Also, the melting portion 15 includes the vertical surface 16 and the inclined surface 17 that is inclined with respect to the vertical surface 16. According to this configuration, the pointed shape of the distal end of the melt rib 13 can be made sharp, and therefore it is possible to make the melt rib 13 more likely to melt during molding of the outer portion 20.

Also, the holder 11 of the inner part 10 of the resin molded article M of the present embodiment is molded using a resin material that does not include reinforcing fibers, whereas the resin body 21 of the outer portion 20 is molded using a resin material that includes reinforcing fibers. According to this configuration, the strength of the resin body 21 of the outer portion 20 can be increased, excellent scratch resistance can be obtained, the fracture toughness of the holder 11 of the inner part 10 can be increased, and the melt rib 13 can be made easier to bend.

OTHER EMBODIMENTS

The present disclosure is not limited to the embodiment described using the description above and the drawings, and for example, the following embodiments are also encompassed in the technical scope of the present disclosure.

In the above-described embodiment, a case was illustrated in which the resin molded article M is a wheel speed sensor, but there is no limitation to this. The present disclosure can be applied to various types of parts, and for example, the present disclosure can be applied also to an insert-molded connector for secondary-molding a housing (outer portion) on an inner part formed by a bus bar or terminal fitting being held in a resin body.

In the above-described embodiment, the number, positions, shapes, and the like of the fixing portions 12 were illustrated specifically, but the number, positions, shapes, and the like of the fixing portions can be changed as appropriate.

In the above-described embodiment, a case was illustrated in which the melt ribs 13 are provided around the fixing portions 12, but there is no limitation to this. The melt ribs can be provided as appropriate at any location that is to be sealed from water on the outer surface of the main body portion of the inner part.

In the above-described embodiment, a case was illustrated in which two or three melt ribs 13 are formed around each fixing portion 12, but there is no limitation to this. One or four or more melt ribs may also be provided around each fixing portion.

In the above-described embodiment, the resin body 21 of the outer portion 20 is molded using a resin material that includes reinforcing fibers, and the holder 11 of the inner part 10 is molded using a resin material that does not include reinforcing fibers, but there is no limitation to this. The resin body of the outer portion and the main body portion of the inner part may also be molded using the same material.

In the above-described embodiment, the melt rib 13 includes the rising portion 14, which has a constant thickness T, but there is no limitation to this. The melt rib need only be able to bend according to distortion, and may also have a form in which, for example, the thickness gradually decreases from the base (outer surface of the holder) to the distal end.

The invention claimed is:

1. An inner part, around which an outer portion is to be arranged through integral molding, the inner part comprising:
   a main body portion made of resin, the main body having a fixing portion, the fixing portion defined by a recess formed on an outer surface of the main body portion; and
   a melt rib provided protruding outward from the main body portion, the melt rib concentric to the fixing portion;
   wherein the melt rib has a height that is greater than a thickness of the melt rib, and the melt rib includes a rising portion that has a constant thickness, and a melting portion with a thickness that gradually decreases from a distal end of the rising portion to a distal end of the melt rib, and
   the melting portion has a vertical surface and an inclined surface that is inclined with respect to the vertical surface so as to taper in a direction from the distal end of the rising portion to the distal end of the melt rib and tapers from an outer surface of the melt rib towards an inner surface of the melt rib, a thickness on the rising portion side of a melting portion is equal to the thickness direction of the rising portion, and a portion of the melting portion melts during molding of the outer portion.

2. A resin molded article comprising:
   the inner part according to claim 1; and
   an outer portion that is molded around the inner part,
   wherein the melting portion is closely adhered to the resin body of the outer portion, and the distal end of the melt rib is melted.

3. The resin molded article according to claim 2, wherein the main body portion is formed using a resin material that does not include reinforcing fibers, whereas
   the outer portion is formed using a resin material that includes reinforcing fibers.

4. The inner part according to claim 1, wherein the melt rib includes a first melt rib spaced apart from a second melt rib.

5. The inner part according to claim 4, wherein the first melt rib has a thickness greater than a thickness of the second melt rib.

6. The inner part according to claim 4, wherein a height of the melting portion of the first melt rib is greater than a height of the rising portion of the first melt rib.

7. The inner part according to claim 4, wherein a height of the melting portion of the second melt rib is smaller than a height of the rising portion of the second melt rib.

* * * * *